April 27, 1926.  1,582,254

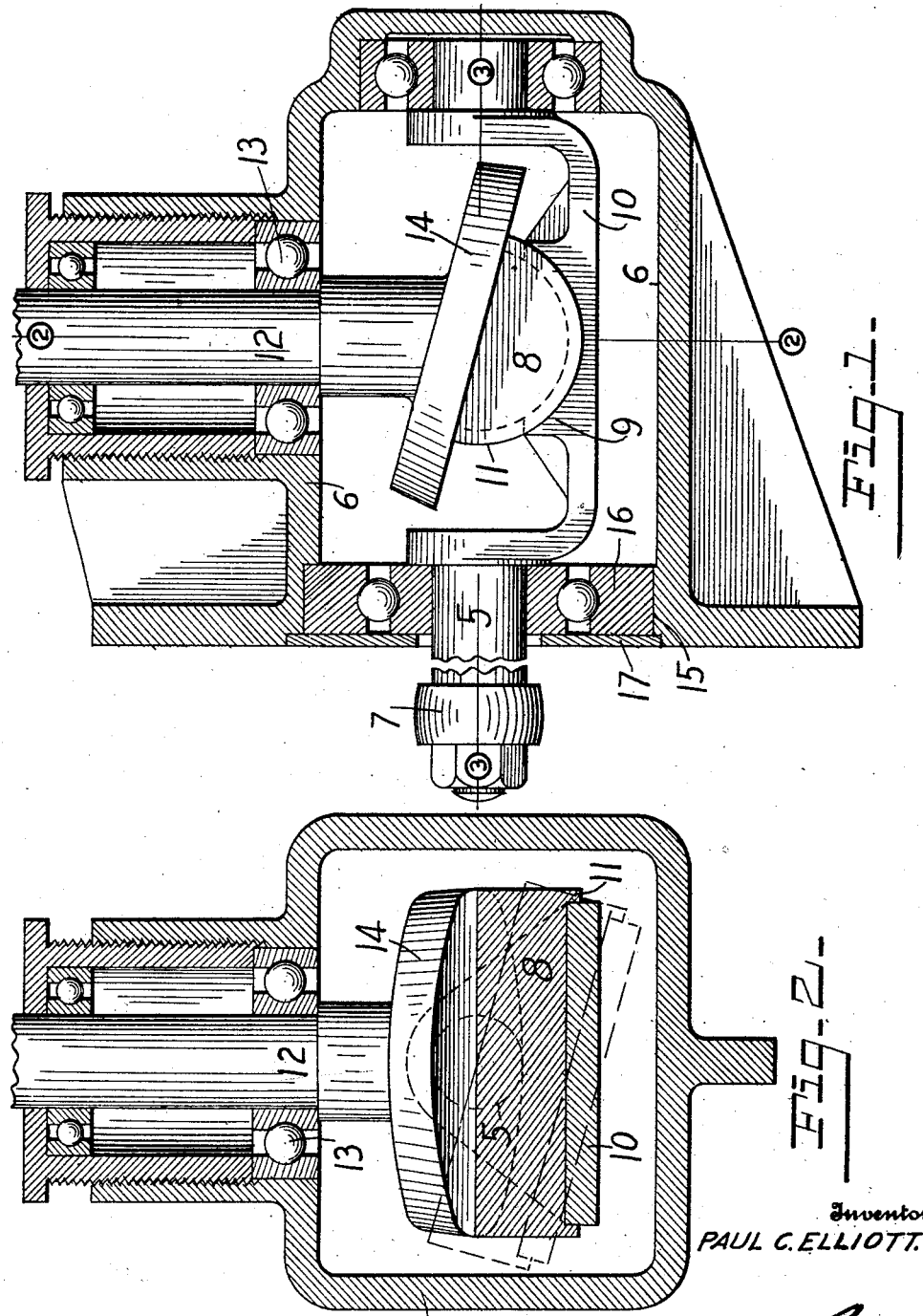

P. C. ELLIOTT

STEERING MECHANISM

Filed Sept. 15, 1921   2 Sheets-Sheet 2

Inventor
PAUL C. ELLIOTT.

By Edward Reed
Attorney

Patented Apr. 27, 1926.

1,582,254

UNITED STATES PATENT OFFICE.

PAUL C. ELLIOTT, OF DAYTON, OHIO.

STEERING MECHANISM.

Application filed September 15, 1921. Serial No. 500,963.

*To all whom it may concern:*

Be it known that I, PAUL C. ELLIOTT, a citizen of the United States, residing at Dayton, in the county of Montgomery and State of Ohio, have invented certain new and useful Improvements in Steering Mechanisms, of which the following is a specification, reference being had therein to the accompanying drawing.

This invention relates to steering mechanisms for automobiles and the like.

One object of the invention is to provide a steering mechanism which will be irreversible.

A further object of the invention is to provide a steering mechanism which will be very simple in its construction, positive in its operation, and of a strong, durable character.

A further object of the invention is to provide a steering mechanism comprising an oil tight housing so constructed that the various operating parts of the mechanism may be readily inserted therein.

Other objects of the invention will appear as the device is described in detail.

Figure 3:
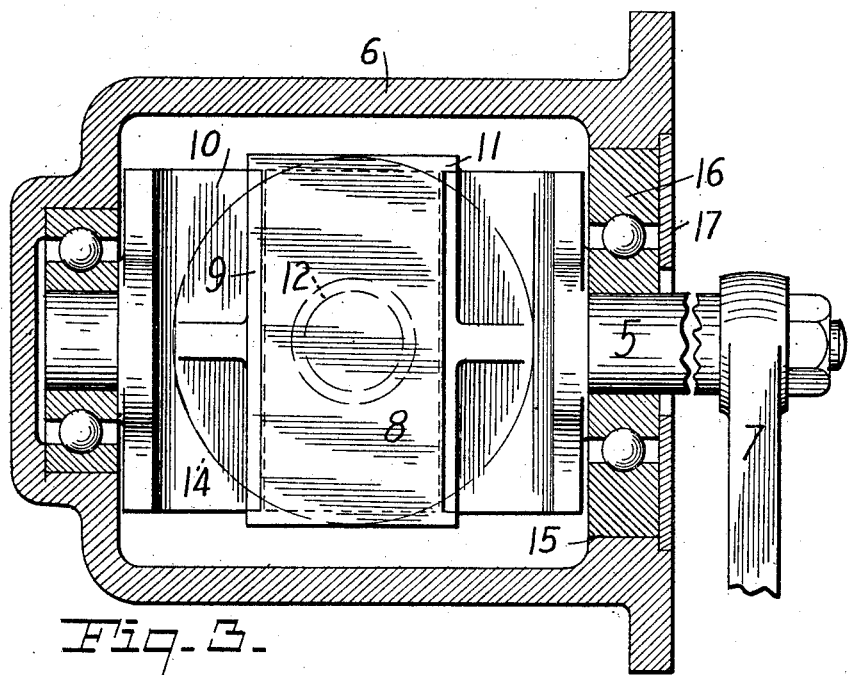
Figure 4:
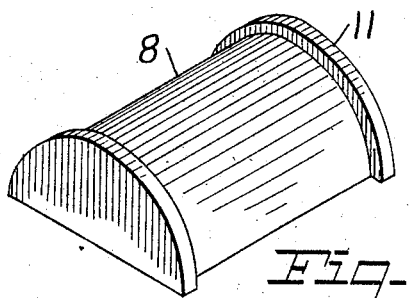

In the accompanying drawings Fig. 1 is a sectional view taken longitudinally of the shaft of a mechanism embodying my invention; Fig. 2 is a section taken on the line 2—2 of Fig. 1; Fig. 3 is a horizontal section taken on the line 3—3 of Fig. 1 with the actuating plate shown in dotted lines; and Fig. 4 is a detail view of the bearing member.

In these drawings I have illustrated one embodiment of my invention and have shown the same as comprising a shaft 5 journaled in the end walls of a housing 6, one end of the shaft extending beyond the wall of the housing and having rigidly secured thereto a stering arm 7 which is adapted to be connected in the usual, or any suitable manner, with the wheels which are to be steered. Connected with the shaft 5 within the housing 6 is a member 8 which is so connected with the shaft that it can have no movement relatively thereto about an axis parallel with the shaft. Consequently, any movement of the member about such an axis will cause the shaft to move therewith. Preferably, the member 8 is capable of rotation about an axis transverse to the axis of the shaft 5. As here shown, the member 8 is semi-cylindrical in form and is mounted in a bearing 9 formed on the shaft 5, the shaft being preferably provided within the casing with an offset portion, or crank, 10 on which the bearing is formed. The bearing block is here shown as having end flanges 11 overlapping the ends of the bearing 9 to hold the member against longitudinal movement. The upper surface of the semi-cylindrical member 8 constitutes a bearing surface and in the present instance is flat. Rigidly secured to the lower end of a steering rod 12, which is journaled in a bearing 13 carried by the housing 6, is an actuating plate, or disk, 14, having a bearing surface arranged in operative engagement with the bearing surface of the member 8, this bearing surface being flat and being arranged in a plane oblique to the axis of the steering rod 12. It will be apparent, therefore, that the rotation of the actuating plate about the axis of the steering rod will rock the bearing member 8 and the shaft 5, the bearing member itself moving about an axis transverse to the shaft to accommodate its bearing surface to the changing positions of the bearing surface of the actuating plate, and that this rocking movement of the shaft 5 will be transmitted to the steering wheels. The mechanism is practically irreversible because no ordinary amount of pressure applied to the shaft 5 and bearing member 8 can rotate the actuating plate 14. Consequently, the wheels will be held rigidly in the position to which they have been adjusted until the actuating plate is shifted by the rotation of the steering rod 12. The mechanism is exceedingly simple in its construction and operation and the several parts are of such a character that they can be quickly and easily assembled. Preferably, the housing 6 is formed in a single piece and is provided at one end with an enlarged opening 15 through which the several parts are inserted in the assembling of the mechanism and which receives a bearing 16 for the shaft 5, the bearing being held in position by a plate 17, which, together with the bearing, closes the opening 15.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a steering mechanism, a housing formed in a single piece and having a relatively large opening in one end thereof, a removable closure for said opening comprising a bearing, a bearing at that end of said housing opposite said opening, a shaft journaled in said bearings and adapted to be connected with the wheels to be steered, a member mounted on said shaft for rocking movement transversely to the axis thereof and held against movement relatively to said shaft about an axis parallel therewith, a steering rod journaled in said housing on an axis transverse to the axis of said shaft, and an actuating plate arranged within said housing and secured to said steering rod in a plane oblique to the axis thereof and having a bearing surface engaging said member, the opening in the end of said housing being of sufficient size to permit the insertion therethrough of said shaft, and said plate.

2. In a steering mechanism, a housing formed in one piece, having one end closed and having a relatively large opening in the other end thereof, a bearing in said housing at the closed end thereof, a closure for the open end of said housing comprising a bearing, a shaft journaled in said bearing and having an offset portion, a member mounted on said offset portion, a rod journaled in said housing on an axis transverse to said shaft, and a plate secured to said rod, extending obliquely thereto and arranged to engage said member, said opening in said end of said housing being of sufficient size to permit the insertion therethrough of said shaft, said member and said plate.

3. In a steering mechanism, a housing formed in a single piece and having one end open, a shaft journaled in said housing and adapted to be connected with the wheels to be steered, a member mounted on said shaft for rocking movement transversely to the axis thereof and held against movement relative to said shaft about an axis parallel therewith, a steering rod journaled in said housing on an axis transverse to the axis of said shaft, an actuating plate arranged within said housing and secured to said steering rod in a plane oblique to the axis thereof and having a bearing surface engaging the first mentioned member, said housing having an enlarged opening in one end thereof to permit the insertion of said parts, a bearing adapted to be mounted in said opening and to receive one end of said shaft, and means for securing said bearing in said opening.

In testimony whereof, I affix my signature hereto.

PAUL C. ELLIOTT.